(12) United States Patent
Kimura et al.

(10) Patent No.: US 9,758,071 B2
(45) Date of Patent: *Sep. 12, 2017

(54) VEHICLE SEAT

(71) Applicant: TOYOTA BOSHOKU KABUSHIKI KAISHA, Aichi-ken (JP)

(72) Inventors: Koji Kimura, Aichi-ken (JP); Atsutaka Mitsuhashi, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 55 days.

This patent is subject to a terminal disclaimer.

(21) Appl. No.: 14/718,530

(22) Filed: May 21, 2015

(65) Prior Publication Data
US 2015/0336486 A1    Nov. 26, 2015

(30) Foreign Application Priority Data
May 23, 2014    (JP) .................................. 2014-106666

(51) Int. Cl.
*A47C 1/00*    (2006.01)
*A61G 15/00*    (2006.01)
(Continued)

(52) U.S. Cl.
CPC ............ *B60N 2/3061* (2013.01); *B60N 2/12* (2013.01); *B60N 2/309* (2013.01); *B60N 2/3011* (2013.01);
(Continued)

(58) Field of Classification Search
CPC .... B60N 2/3093; B60N 2/309; B60N 2/3011; B60N 2/3061; B60N 2/12; B60N 2/20;
(Continued)

(56) References Cited

U.S. PATENT DOCUMENTS 3,416,839 A * 12/1968 Flint ................... A47C 1/03255
297/301.1
5,527,087 A * 6/1996 Takeda ................. B60N 2/2352
297/15
(Continued)

FOREIGN PATENT DOCUMENTS

CN    101734179    6/2010
CN    101883697    8/2012
(Continued)

OTHER PUBLICATIONS

Official Action, along with English-language translation thereof, in CN Appl. No. 201510266973.4 dated Dec. 27, 2016.
(Continued)

*Primary Examiner* — Chi Q Nguyen
(74) *Attorney, Agent, or Firm* — Greenblum & Bernstein, P.L.C.

(57) ABSTRACT

A vehicle seat including: a tilt down mechanism configured to sink down a seat cushion in conjunction with forward tilting down movement of a seat back, wherein the tilt down mechanism couples a rear part of the seat cushion to a base on a floor by a rotary shaft, couples a front part of the seat cushion to the base via a front link, and further includes a power transmission member that couples the front link and the seat back, and wherein the tilt down mechanism is configured so that the power transmission member tilts the front link downward in conjunction with the forward tilting down movement of the seat back, thereby sinking down the front part of the seat cushion about the rotary shaft.

7 Claims, 8 Drawing Sheets

(51) Int. Cl.
*B60N 2/00* (2006.01)
*B60N 2/02* (2006.01)
*B60N 2/30* (2006.01)
*B60N 2/44* (2006.01)
*B60N 2/12* (2006.01)
B60N 2/20 (2006.01)
B60N 2/36 (2006.01)

(52) U.S. Cl.
CPC ......... *B60N 2/3013* (2013.01); *B60N 2/3065* (2013.01); *B60N 2/3075* (2013.01); *B60N 2/36* (2013.01); *B60N 2/442* (2013.01); *B60N 2/20* (2013.01); *B60N 2/305* (2013.01); *B60N 2/3093* (2013.01); *B60N 2002/363* (2013.01)

(58) Field of Classification Search
CPC  B60N 2/3013; B60N 2002/363; B60N 2/305; B60N 2/36
USPC .... 297/340, 341, 327, 344.1, 344.15, 452.2, 297/260.1, 378.1, 378.12, 378.11; 296/65.01
See application file for complete search history.

(56) References Cited

U.S. PATENT DOCUMENTS

| | | | |
|---|---|---|---|
| 5,593,208 A | 1/1997 | Mitschelen et al. | |
| 6,000,742 A * | 12/1999 | Schaefer | B60N 2/3011 296/65.09 |
| 6,079,763 A * | 6/2000 | Clemente | B60N 2/3011 248/430 |
| 8,047,610 B2 | 11/2011 | Yamagishi | |
| 8,235,466 B2 * | 8/2012 | Yamada | B60N 2/3011 297/284.1 |
| 8,388,065 B2 | 3/2013 | Harden | |
| 2009/0108616 A1* | 4/2009 | Kolena | B60N 2/01583 296/65.05 |
| 2009/0152888 A1* | 6/2009 | Zelmanov | B60N 2/206 296/65.09 |
| 2009/0322133 A1* | 12/2009 | Yamada | B60N 2/3011 297/284.9 |
| 2010/0194134 A1 | 8/2010 | Ehrhard et al. | |
| 2010/0244524 A1 | 9/2010 | Kumazaki et al. | |
| 2011/0042994 A1 | 2/2011 | Saito et al. | |
| 2011/0241400 A1* | 10/2011 | Ito | B60N 2/1615 297/311 |
| 2012/0056459 A1 | 3/2012 | Harden | |
| 2013/0001394 A1 | 1/2013 | Calvert | |
| 2014/0284981 A1* | 9/2014 | Nagayasu | B60N 2/2209 297/340 |

FOREIGN PATENT DOCUMENTS

| | | |
|---|---|---|
| DE | 43 42 438 | 5/1995 |
| DE | 10 2005 056 570 | 5/2007 |
| EP | 1 902 896 | 3/2008 |
| JP | 2000-247170 | 9/2000 |
| JP | 2009-154681 | 7/2009 |
| JP | 2009-154682 | 7/2009 |
| JP | 5382709 | 10/2013 |

OTHER PUBLICATIONS

Official Action, along with English-language translation thereof, in DE Appl. No. 10 2015 209 436.7 dated Mar. 9, 2017.
U.S. Appl. No. 14/718,657 to Atsutaka Mitsuhashi, filed May 21, 2015.
Official Action, along with English-language translation thereof, issued in JP Appl. No. 2014-106666 dated Jul. 4, 2017.

* cited by examiner

VEHICLE SEAT

CROSS-REFERENCE TO RELATED APPLICATIONS

This application claims priority from Japanese Patent Application No. 2014-106666 filed on May 23, 2014, the entire contents of which are incorporated herein by reference.

TECHNICAL FIELD

Aspects of the present invention relate to a vehicle seat. More particularly, aspects of the present invention relate to a vehicle seat including a tilt down mechanism that sinks down a seat cushion in conjunction with forward tilting down movement of a seat back.

BACKGROUND

In the related art, a seat for an automobile has been known which has a so-called tilt down mechanism configured to sink down a seat cushion in conjunction with forward tilting down movement of a seat back, thereby lowering the entire seat (see JP-A-2009-154682). The tilt down mechanism is configured to suspend a rear part of the seat cushion to the seat back by a link and to obliquely push down the whole seat cushion in a front-lower direction as the seat back is tilted down forward.

According to the above technology, the entire seat cushion is sunk down. Therefore, the corresponding technology is unfavorable to a configuration where a hybrid battery is embedded in a region under the floor, for example, so that it is not possible to form a deep sinking space. It is therefore an object of the present invention to provide a tilt down mechanism capable of effectively sinking down a seat cushion also in a narrow sinking space.

SUMMARY

In order to achieve the above object, aspects of the present invention provide the following vehicle seat.

According to an aspect of the present invention, there is provided a vehicle seat including: a tilt down mechanism configured to sink down a seat cushion in conjunction with forward tilting down movement of a seat back, wherein the tilt down mechanism couples a rear part of the seat cushion to a base on a floor by a rotary shaft, couples a front part of the seat cushion to the base via a front link, and further includes a power transmission member that couples the front link and the seat back, and wherein the tilt down mechanism is configured so that the power transmission member tilts the front link downward in conjunction with the forward tilting down movement of the seat back, thereby sinking down the front part of the seat cushion about the rotary shaft.

Accordingly, the seat cushion is configured to sink down to the floor so that the front part thereof is dropped about the rotary shaft at the rear side by the tilt down mechanism. In general, the seat cushion is configured in many cases so that a pad thickness is set to be thick in the rear region of the seat cushion so as to support hip parts having a high sitting pressure and is set to be relatively thinner in the front region of the seat cushion to support the femoral regions, as compared to the pad thickness in the rear region of the seat cushion, and the seat cushion is formed to have a front rising shape so as to prevent the hip parts from sliding forward. Therefore, when the seat cushion is configured to sink down to the floor so that the front part thereof is dropped about the rear side rotary shaft, as described above, it is possible to effectively sink down the seat cushion also in a narrow sinking space. The corresponding configuration is not limited to a case where it is applied to the narrow sinking space of the seat cushion, and can also be applied to a wide sinking space. That is, the corresponding configuration can be applied to a variety of configurations, as one of methods of sinking down the seat cushion.

DETAILED DESCRIPTION

Hereinafter, an illustrative embodiment of the present invention will be described with reference to the drawings.

First Illustrative Embodiment

Figure 1:
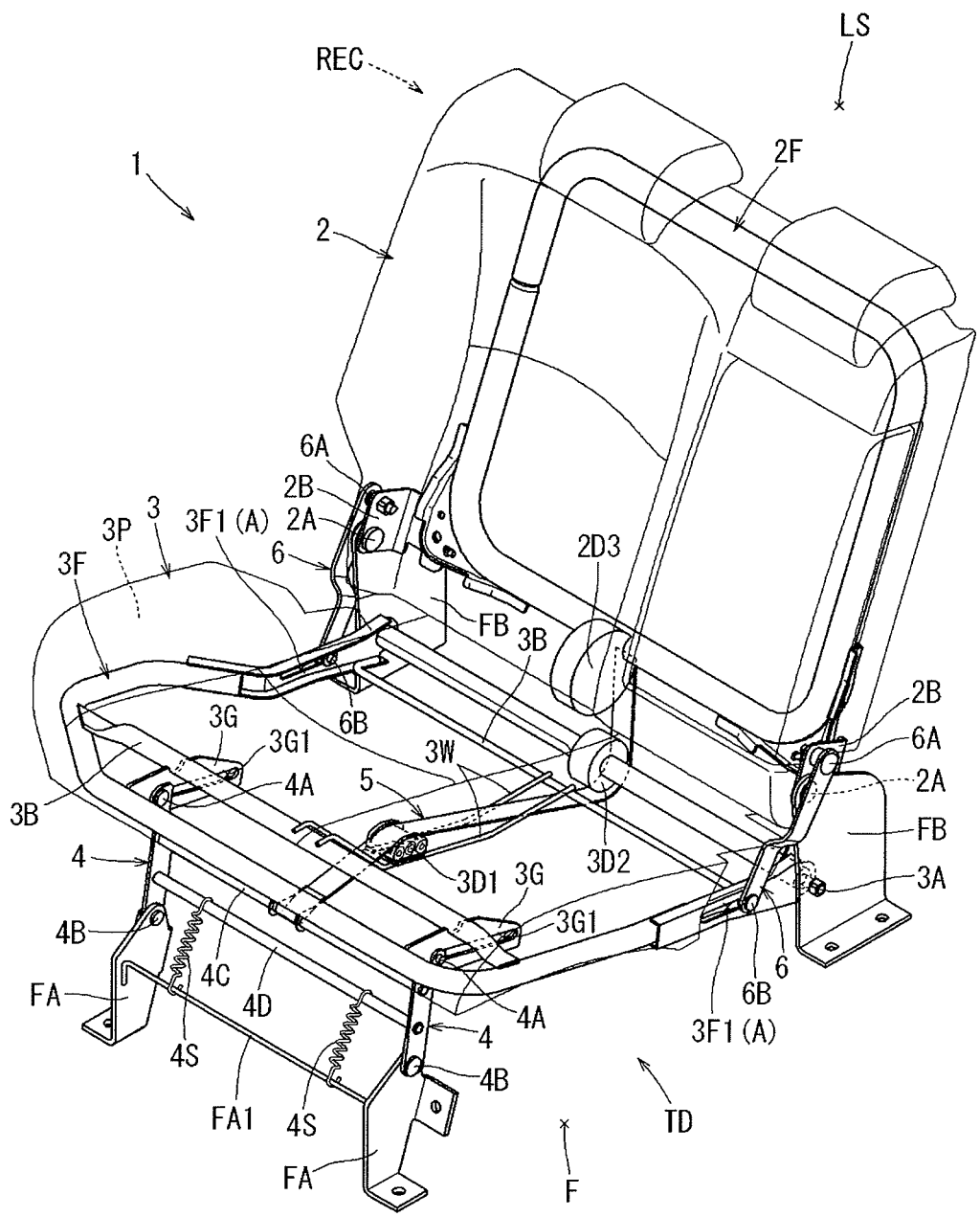
FIG. 1 is a perspective view illustrating a configuration of a vehicle seat of a first illustrative embodiment.

First, a configuration of a seat 1 of a first illustrative embodiment is described with reference to FIGS. 1 to 8. As shown in FIG. 1, the seat 1 of the illustrative embodiment is configured as a rear seat for an automobile, and a luggage space LS of a vehicle is formed at the rear of the seat 1. The seat 1 has a seat back 2 serving as a backrest of a sitting passenger and a seat cushion 3 serving as a sitting part. The seat 1 has a reclining mechanism REC configured to adjust a backrest angle of the seat back 2, and a tilt down mechanism TD (see FIGS. 4 to 6) configured to sink down the seat cushion 3 in conjunction with forward tilting down movement of a seat back.

Figure 4:
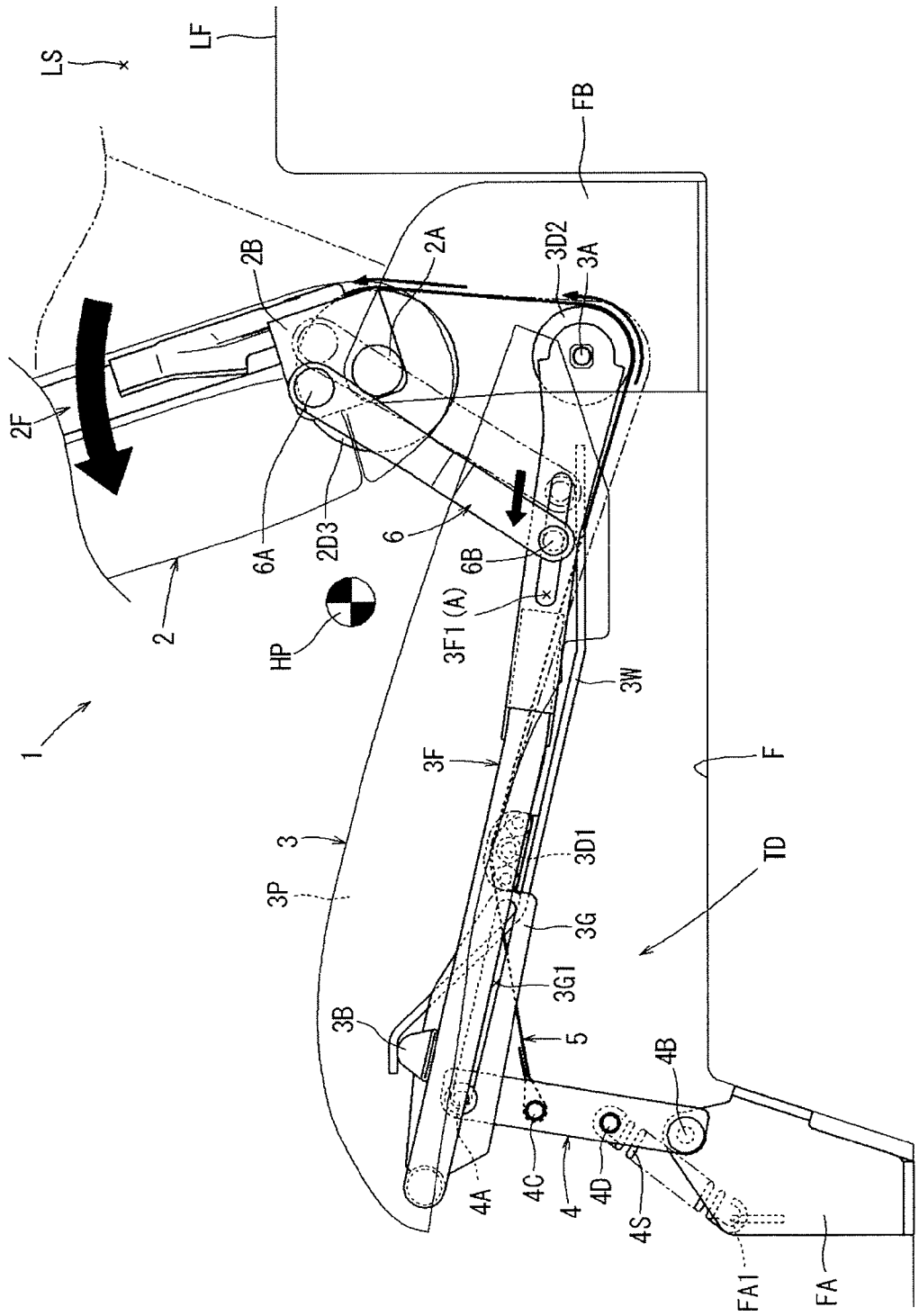
FIG. 4 is a side view illustrating a state where the seat back is tilted down to a forward tilting position.
Figure 5:
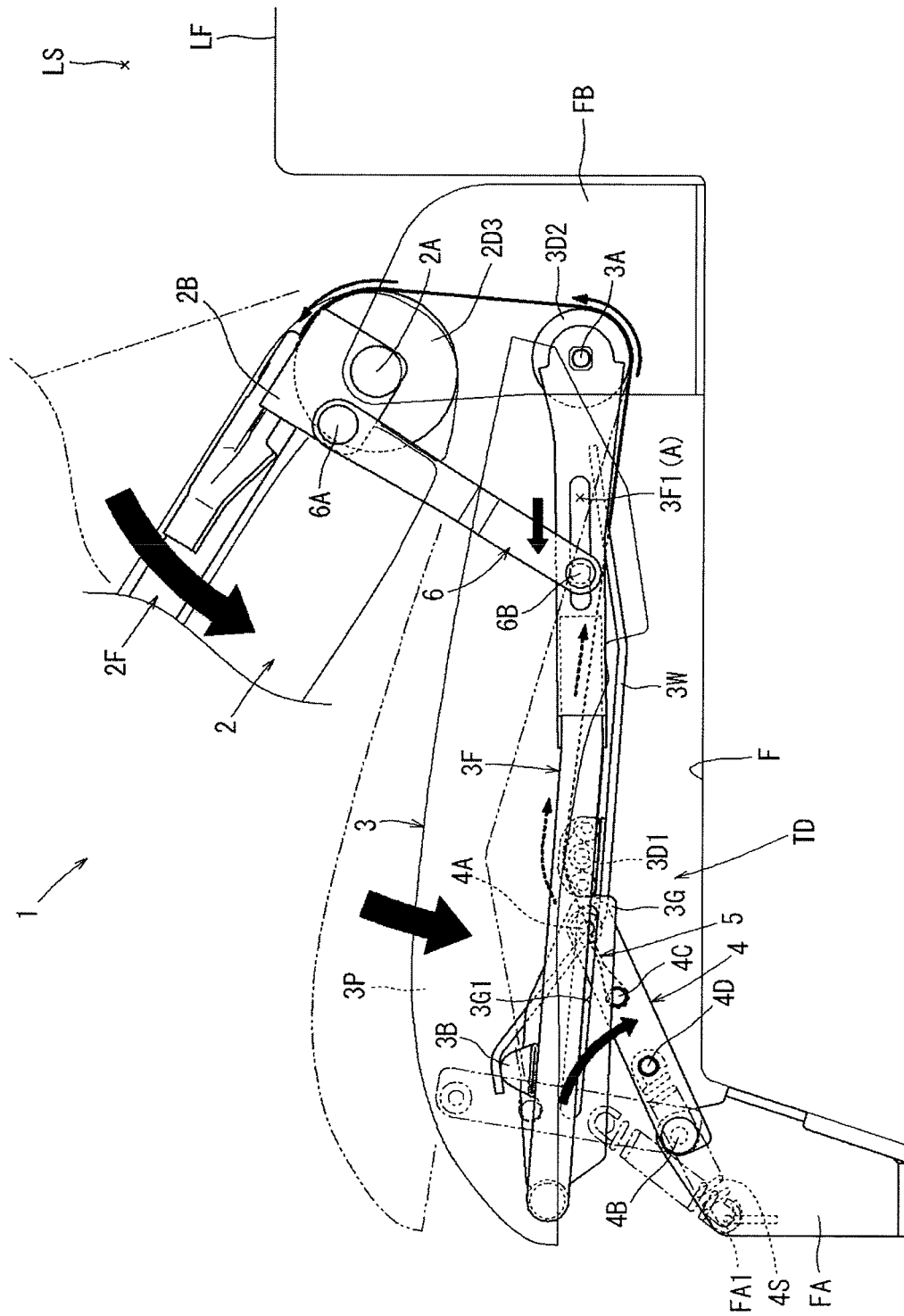
FIG. 5 is a side view illustrating a state where the seat back is being further tilted down forward from the forward tilting position.
Figure 6:
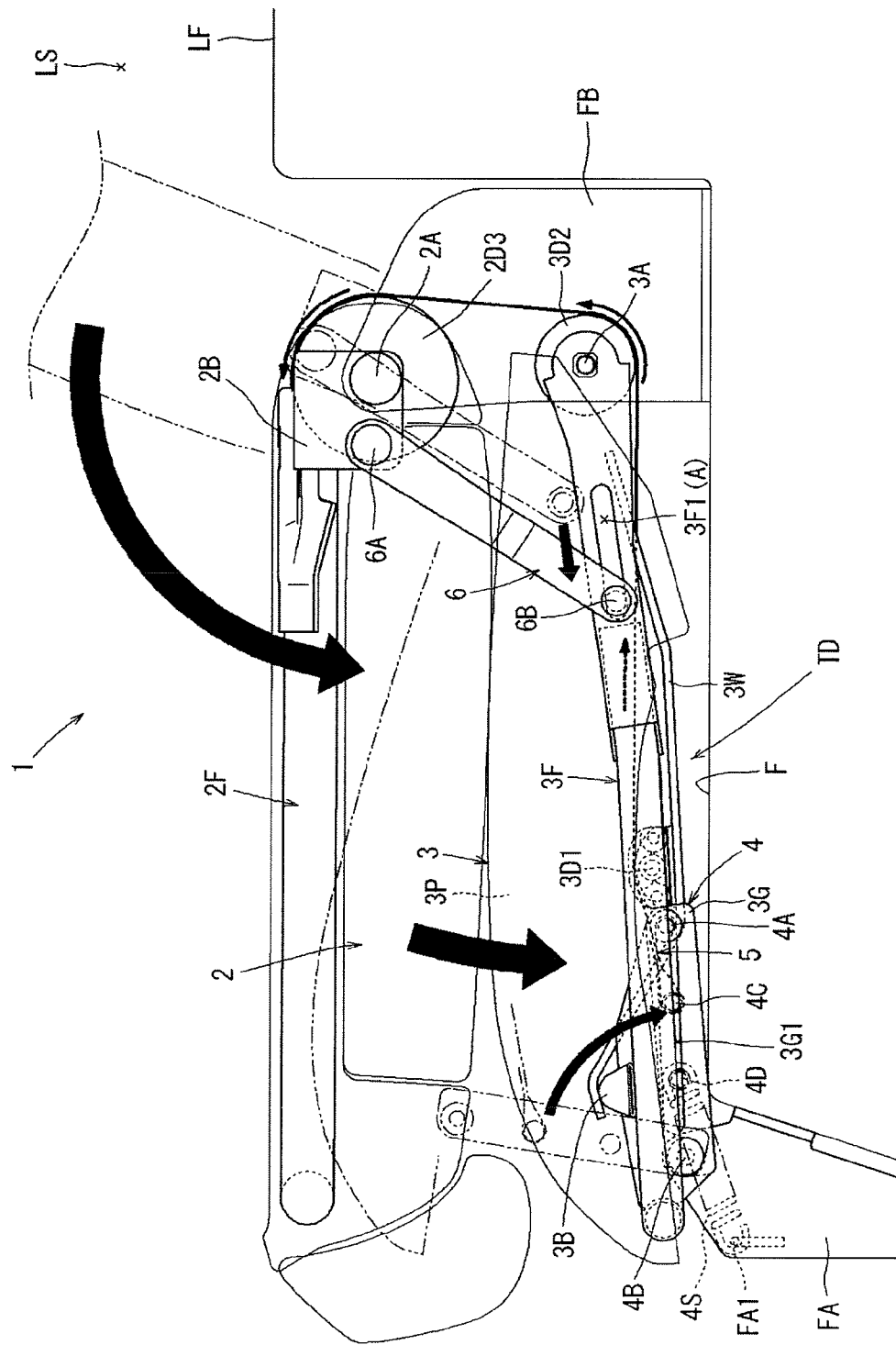
FIG. 6 is a side view illustrating a state where the seat back is tilted down forward and a seat cushion is thus sunk down.

The reclining mechanism REC is configured to fix the backrest angle of the seat back 2 with respect to a vehicle side part and to change the backrest angle of the seat back 2 by changing the fixed position with respect to the vehicle side part. As shown in FIGS. 4 to 6, the tilt down mechanism TD is configured to drop the seat cushion 3 onto a floor F in conjunction with the forward tilting down movement of the seat back 2, thereby tilting down the seat back 2 to a low position flush with a luggage floor LF, as shown in FIG. 6.

In the illustrative embodiment, although the seat 1 is configured to drop the seat cushion 3 in conjunction with the forward tilting down movement of the seat back 2 by the tilt down mechanism TD, the seat 1 is also configured to prevent the seat cushion 3 from moving when the seat back 2 is tilted within an adjustment region of the backrest angle. By the configuration, even when the backrest angle of the seat back 2 is changed, it is possible to keep the seat cushion 3 at a fixed position all the time, thereby maintaining a favorable ride quality. In the below, the specific configurations of the respective parts of the seat 1 are described in detail.

As shown in FIG. 1, the seat back 2 is coupled at lower end portions of both left and right sides thereof to a pair of left and right rear bases FB fixed on the floor F by coupling shafts 2A so that it can be rotated rearward and forward. Specifically, the seat back 2 has a configuration where respective brackets 2B coupled to lower end portions of both left and right sides of a back frame 2F forming a frame of the seat back 2 are rotatably coupled to each of a pair of left and right rear bases FB fixed on the floor F by the respective coupling shafts 2A of which an axis direction faces towards a width direction of the seat.

Although not shown, the seat back 2 has a configuration where a lock device provided at a shoulder part of a vehicle outer side, which is a left side of FIG. 1, is locked to a striker provided at the vehicle side part, so that the backrest angle is fixed. The striker, which is not shown, is attached to the vehicle side part to be slidable rearward and forward and can be locked at each slid position. Thereby, the backrest angle of the seat back 2 fixed by the striker can be adjusted by changing a slide position of the striker (the reclining mechanism REC).

Figure 2:
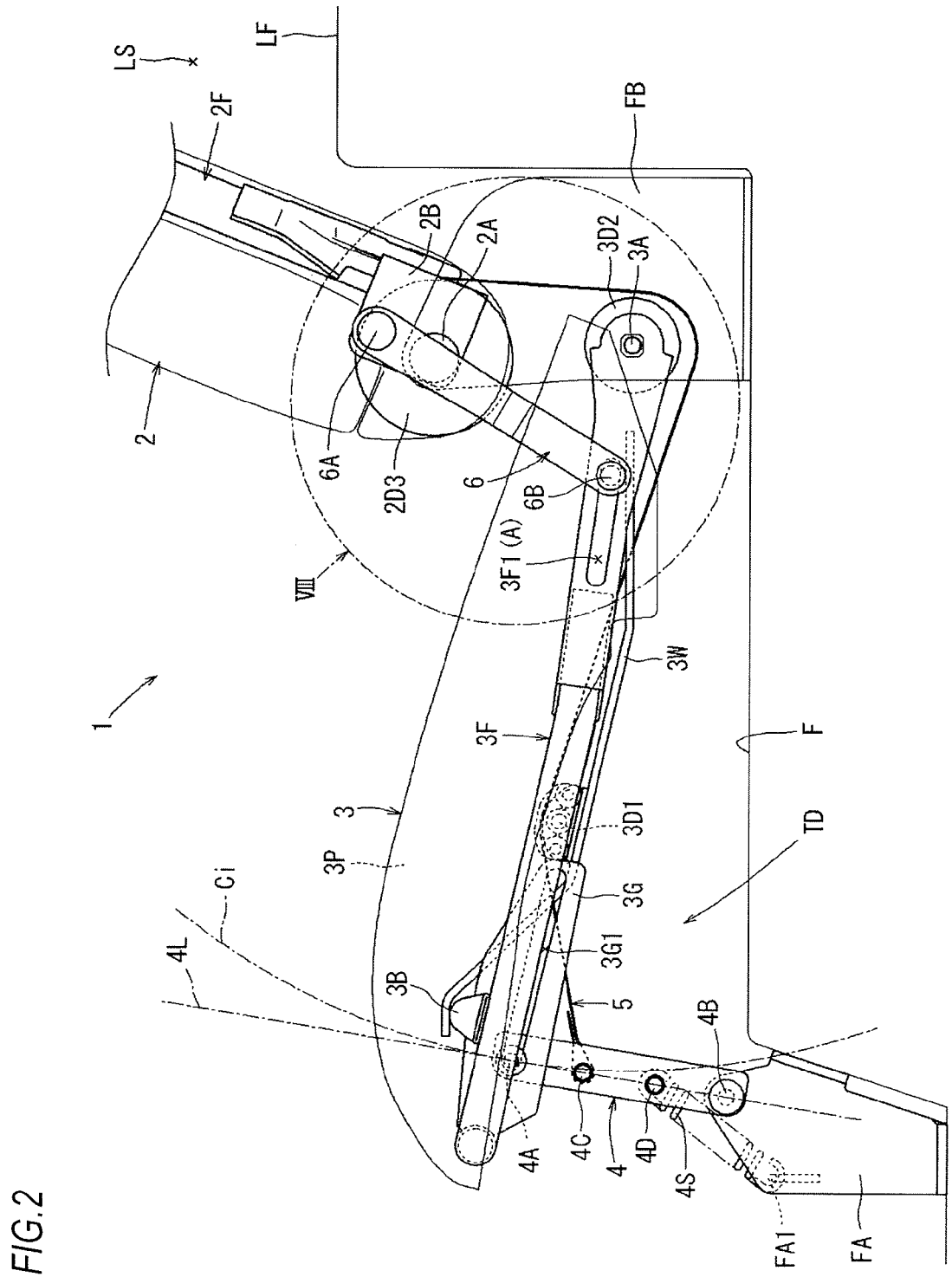
FIG. 2 is a side view of a seat back.
Figure 3:
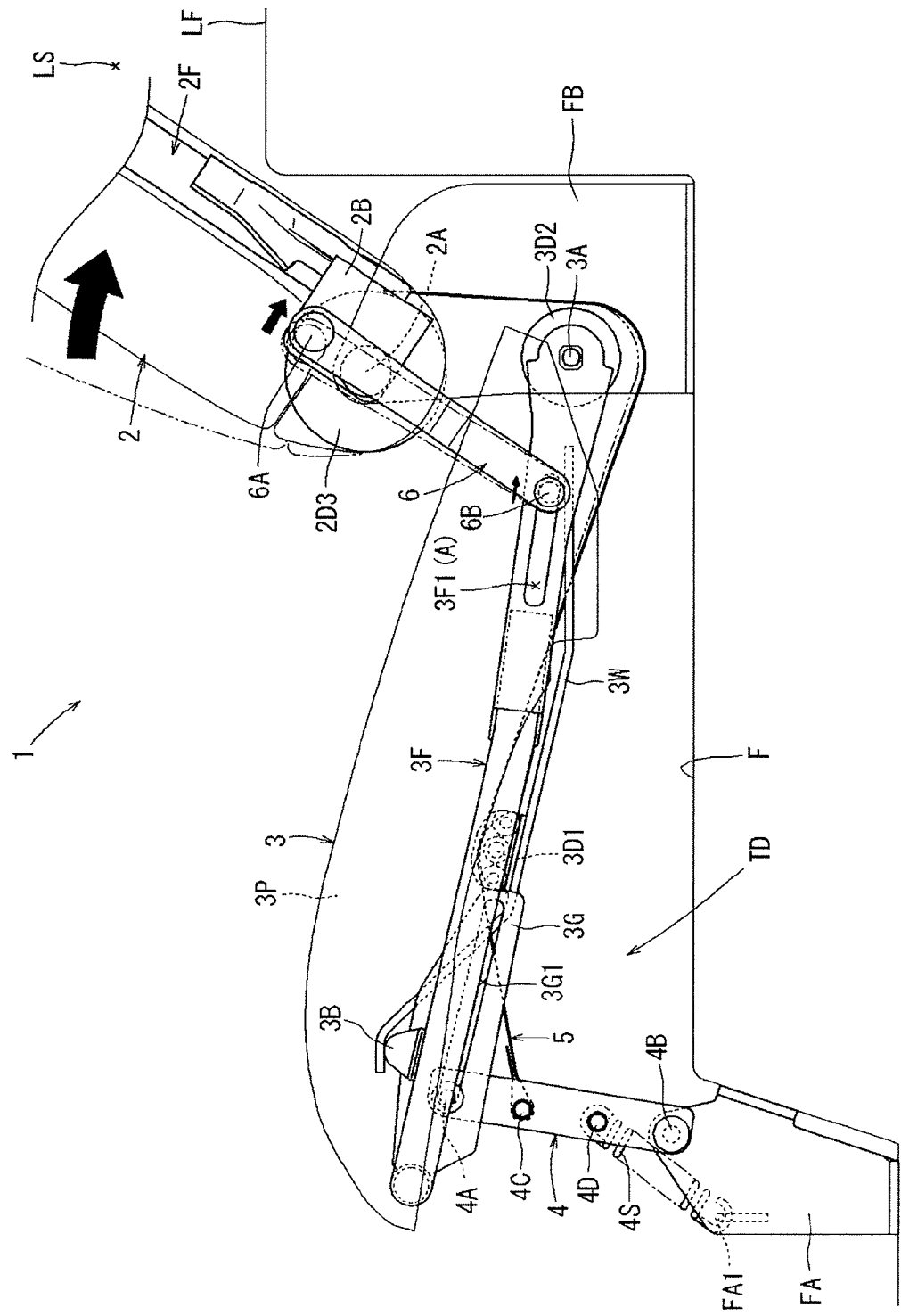
FIG. 3 is a side view illustrating a state where a backrest angle of the seat back is tilted rearward.

As shown in FIGS. 2 and 3, a moveable range of the striker (not shown) is set within an angle range in which the seat back 2 is tilted rearward from an upright posture. Thereby, it is possible to fix the backrest angle of the seat back 2 within the moveable range of the striker so that the backrest angle can be adjusted relative to the vehicle side part. In the meantime, since the specific configuration of the reclining mechanism REC (see FIG. 1) is the same as the well-known configuration disclosed in Japanese Patent No. 5,382,709, for example, the specific description thereof is omitted. When the locked state of the seat back 2 to the striker is released, the seat back 2 can be tilted forward beyond the adjustable range of the backrest angle, as shown in FIGS. 4 to 6.

As shown in FIG. 1, the seat cushion 3 is coupled at rear end portions of both left and right sides thereof to the pair of left and right rear bases FB fixed on the floor F by one rotary shaft 3A, which is long in the width direction of the seat, so that it can be rotated in a height direction. Specifically, the seat cushion 3 has a configuration where rear end portions of both left and right sides of a cushion frame 3F, which is formed by bending a round pipe forming a frame of the seat cushion 3 into a U shape, are rotatably coupled to each of the pair of left and right rear bases FB fixed on the floor F by the one rotary shaft 3A of which an axis direction faces towards the with direction of the seat.

The seat cushion 3 has a configuration where front parts of both left and right sides thereof are respectively coupled to each of a pair of left and right front bases FA fixed on the floor F via front links 4 at a raised position. Specifically, the seat cushion 3 has a configuration where upper end portions of the respective front links 4 are respectively coupled to a pair of left and right guide plates 3G, which are coupled to a front frame part of the cushion frame 3F and extend rearward, to be rotatable and to be slidable rearward and forward via slide shafts 4A. Each slide shaft 4A is coupled in a long hole 3G1, which is formed at the guide plate 3G and extends rearward and forward, to be rotatable and to be slidable rearward and forward with an axis direction thereof facing towards the width direction of the seat. Here, each front base FA and each rear base FB correspond to the 'base' of the present invention.

A lower end portion of each front link 4 is rotatably coupled to each front base FA by each coupling shaft 4B of which an axis direction faces towards the width direction of the seat. Thereby, each front link 4 can be rotated to rise or fall rearward and forward about the lower end-side coupling shaft 4B within the range in which the upper end-side slide shaft 4A can slide rearward and forward in the long hole 3G1 of the guide plate 3G.

As shown in FIG. 2, when each front link 4 is rotated to rise forward about the lower end-side coupling shaft 4B, the upper end-side slide shaft 4A is slid to a front end portion position in the long hole 3G1 of the guide plate 3G, so that the front link 4 takes a posture standing up to a substantially vertical angle position from each front base FA. Thereby, a front side part of the seat cushion 3 is supported at an angle posture of a front rising shape.

At this state (state where each slide shaft 4A is slid to the front end portion position in the long hole 3G1 of each guide plate 3G), each front link 4 takes a posture where a line 4L connecting the upper end-side slide shaft 4A and the lower end-side coupling shaft 4B forms a tangential line of a circle $C_i$ drawn around the rear end-side rotary shaft 3A of the seat cushion 3. Thereby, each front link 4 supports the seat cushion 3 from below at a stable posture where the front link is not tilted even when the load is applied thereto from the seat cushion 3.

Also, a retraction belt 5 is coupled between each front link 4 and the seat back 2. When the seat back 2 is tilted forward, the retraction belt 5 pulls each front link 4 so that each front link 4 is tilted rearward. The retraction belt 5 is configured by a flexible band-shaped member and is coupled between a bridging shaft 4C bridged between the respective front links 4 and the back frame 2F forming a frame of the seat back 2. Here, the retraction belt 5 corresponds to the 'power transmission member' of the present invention.

Specifically, the retraction belt 5 is configured to pass through a lower region of the seat cushion 3 at the center in the width direction of the seat, to extend rearward from a coupled part with the bridging shaft 4C, and to be contacted and supported at a substantially central part of the seat cushion 3 in the front-rear direction from a lower side of the retraction belt by a first belt guide 3D1 so that it is bent into a mountain shape. Also, the retraction belt 5 is configured to be contacted and supported at a rear end part of the seat cushion 3 from an upper side thereof by a second belt guide 3D2 so that it is bent upwardly. The retraction belt 5 is attached to a belt attaching part 2D3 attached to a lower frame part of the back frame 2F.

As shown in FIG. 1, the first belt guide 3D1 is attached between a pair of left and right support wires 3W bridged between the front and rear bridging frames 3B bridged between both side frame parts of the cushion frame 3F forming a frame of the seat cushion 3. In the meantime, each of the pair of left and right guide plates 3G coupled to the front frame part of the cushion frame 3F is also integrally coupled at its upper edge portion to the front bridging frame 3B, and is thus strongly supported.

The second belt guide 3D2 is attached to a central part of the long rotary shaft 3A in the width direction of the seat, which is configured to shaft-support the rear end portion of the seat cushion 3 to each rear base FB. The second belt guide 3D2 has a wheel shape and is formed to bend and guide the retraction belt 5 upwardly from the lower region of the rotary shaft 3A via the rear region. The belt attaching part 2D3 has also a wheel shape and is configured to attach an end portion of the retraction belt 5 to a lower position of the lower frame part of the back frame 2F at a state where the seat back 2 is located within the adjustment region of the backrest angle, as shown in FIGS. 2 and 3.

As specifically shown in FIGS. 2 and 3, the retraction belt 5 is slack at a state where the seat back 2 is located within the adjustment region of the backrest angle, and does not transmit a tensile force, which is accompanied by a change in the backrest angle of the seat back 2, to each front link 4 even when the backrest angle of the seat back 2 is changed in the adjustment region. As shown in FIG. 4, when the seat back 2 is tilted down forward to a position, which is set as a hip point HP of a sitting passenger, the retraction belt 5 is wound onto the belt attaching part 2D3 and is retracted into the seat back 2, so that the retraction belt 5 is at a tensioned state with the slackness thereof being removed.

As shown in FIGS. 5 and 6, when the seat back 2 is further tilted down forwards from the forward tilting position shown in FIG. 4, the retraction belt 5 is further wound onto the belt attaching part 2D3, so that it transmits the forward tilting down movement of the seat back 2 to the respective front links 4 and thus tilts down rearward the respective front links 4. Thereby, the seat cushion 3 is pushed down about the rear end-side rotary shaft 3A to drop the front part thereof onto the floor F, so that the seat back 2 is tilted down into an empty space and the whole seat 1 is deeply sunk down.

Also, as shown in FIG. 1, two tensile springs 4S are hooked between the respective front links 4 and the respective front bases FA. The tensile springs 4S are respectively hooked at left and right sides between a bridging shaft 4D bridged between the respective front links 4 and a hanging wire FA1 bridged between the respective front bases FA. As shown in FIGS. 2 and 3, when each front link 4 is located within an upright rotating angle region, the tensile spring 4S passes over a region upper to the lower end-side coupling shaft 4B of each front link 4, thereby applying a rotational urging force to each front link 4 in a forward raising direction.

However, as shown in FIGS. 5 and 6, when each front link 4 is tilted rearward as the seat back 2 is tilted forward, each tensile spring 4S traverses a region lower to the lower end-side coupling shaft 4B of each front link 4. Thereby, the direction of the rotating urging force applied to each front link 4 is switched, so that each tensile spring 4S applies the rotating urging force to each front link 4 in a rearward tilting direction.

The turnover-type tensile springs 4S are hooked between the respective front links 4 and the respective front bases FA, so that when the respective front links 4 are located at the upright rotating posture, as shown in FIGS. 2 and 3, the respective slide shafts 4A thereof are kept in a state of being pressed to the front end portion positions of the long holes 3G1 of the respective guide plates 3G. Thereby, as described above, each front link 4 is configured to stably keep the upright posture state where the front link 4 is not tilted even when the load is applied thereto from the seat cushion 3.

Also, as shown in FIGS. 5 and 6, when the respective front links 4 are retracted and tilted rearward by the retraction belt 5 as the seat back 2 is tilted forward, the respective front links 4 are pressed and kept in a state of being tilted rearward by the urging force of the respective tensile springs 4S. Thereby, each front link 4 is stably kept in a state of being pressed to the floor F without rattling on the floor F.

As shown in FIG. 1, a tensile link 6, which is configured to pull up the seat cushion 3 from the sunk-down position on the floor F as the seat back 2 is raised rearward from the forward tilted position shown in FIG. 6, is respectively coupled between both side parts of the seat back 2 and the seat cushion 3. As shown in FIG. 1, each of the tensile links 6 is configured by a plate member that is bent into a crank shape in the width direction of the seat and is long in the height direction.

An upper end portion of the tensile link 6 is rotatably coupled to each bracket 2B, which is coupled to each lower end portion of both left and right sides of the back frame 2F forming a frame of the seat back 2, by a coupling shaft 6A of which an axis direction faces towards the width direction of the seat. As shown in FIGS. 2 and 3, each of the coupling shafts 6A is arranged so that it is positioned in a region at an upper-rear side of each rotary shaft 2A serving as a center of rotation of the seat back 2 at a state where the seat back 2 is located within the adjustment region of the backrest angle.

Also, a lower end portion of each tensile link 6 is coupled to each long hole 3F1, which is formed at each of both left and right side frame parts of the cushion frame 3F forming a frame of the seat cushion 3, via a slide shaft 6B so that it can be rotated and slid rearward and forward. Each long hole 3F1 formed at each side frame part of the cushion frame 3F is formed as a penetrated hole straightly extending in the front-rear direction along which each side frame part extends.

As shown in FIGS. 2 and 3, when the seat back 2 is located within the adjustment region of the backrest angle, each tensile link 6 is provided to follow a side shape of the seat back 2 or seat cushion 3 at a state where the lower end-side slide shaft 6B is positioned in a rear side region of the long hole 3F1. Thereby, each tensile link 6 is provided at a position at which it does not interfere with a sitting passenger, without protruding forward from the seat back 2 or protruding upwardly from the seat cushion 3.

As shown in FIGS. 4 to 6, each tensile link 6 is configured to slide forward in the long hole 3F1 so that the lower end-side slide shaft 6B is pushed from the rear by the upper end-side coupling shaft 6A as the seat back 2 is tilted down forward. As shown in FIG. 6, when the seat back 2 is completely tilted down forward, the upper end-side coupling shaft 6A of the tensile link 6 is positioned in a front region of each rotary shaft 2A, which is a center of rotation of the seat back 2, and the lower end-side slide shaft 6B is positioned in the front end-side region of the long hole 3F1.

Figure 7:
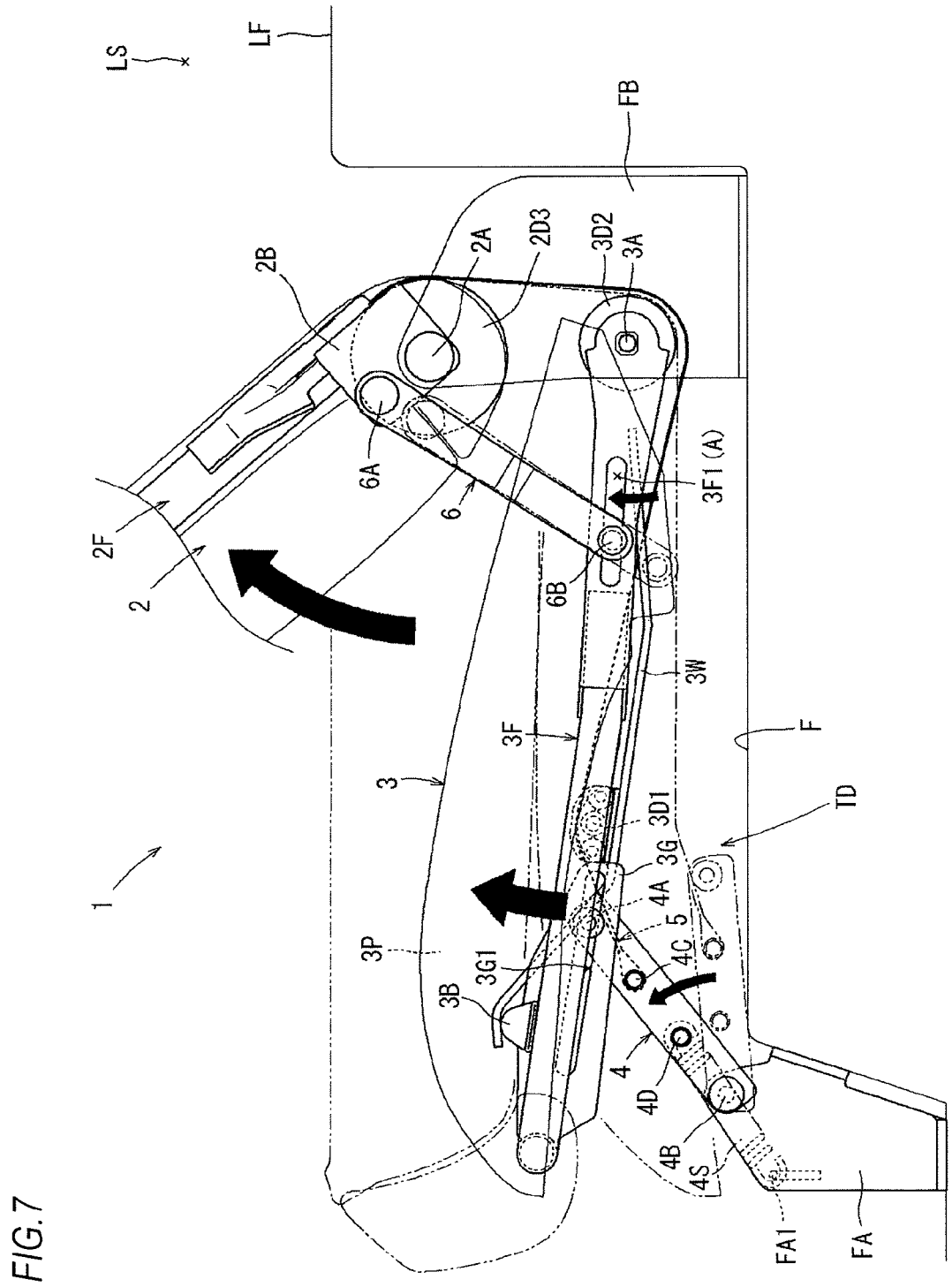
FIG. 7 is a side view illustrating a state where the seat back is being raised from the position at which the seat back is tilted forward.

As shown in FIG. 7, each tensile link 6 is operated so that the lower end-side slide shaft 6B is pulled up in the rear-upper direction by the upper end-side coupling shaft 6A as the seat back 2 is raised rearward from the tiled down state onto the floor F (see FIG. 6). Thereby, each tensile link 6 pulls up the seat cushion 3 coupled to the lower end-side slide shaft 6B thereof around the rear end-side rotary shaft 3A, thereby returning the seat cushion 3 to an initial sitting using position before the seat cushion 3 is sunk down onto the floor F. Specifically, each tensile link 6 is configured to pull up the seat cushion 3 as the lower end-side slide shaft 6B is slid rearward in each long hole 3F1.

At this time, at the state where the seat back 2 is tilted down onto the floor F (see FIG. 6), each tensile link 6 can raise the seat cushion 3 around the rear end-side rotary shaft 3A with a relatively weak force by the force with which the seat back 2 is raised rearward, because the lower end-side slide shaft 6B is positioned in the front end-side region of the long hole 3F1. The reason is that each slide shaft 6B is arranged at a position (front end-side region of each long hole 3F1) spaced forward from the rear end-side rotary shaft 3A of the seat cushion 3.

Also, at the state where the seat back 2 is tilted down onto the floor F (see FIG. 6), each tensile link 6 can effectively pull up the seat cushion 3 by the operating movement amount with which the seat back 2 is raised rearward, because the upper end-side coupling shaft 6A is positioned in the front region of each rotary shaft 2A, which is a center of rotation of the seat back 2. The reason is that as each coupling shaft 6A is raised towards the rear of the seat back 2, each coupling shaft 6A passes through the region largely moving upwards around each rotary shaft 2A, which is a center of rotation of the seat back 2.

As the seat back 2 is raised and the seat cushion 3 is thus pulled up, the upper end-side slide shaft 4A is guided by the shape of each long hole 3G1 formed at the guide plate 3G of the seat cushion 3, so that each front link 4 is also slid and raised forward. When the seat back 2 is returned to the backrest using position (adjustment region of the backrest angle) as shown in FIG. 2, the upper end-side slide shaft 4A is applied with the urging force of each tensile spring 4S and is returned to the state where it is pressed to the front end portion position of each long hole 3G1 of the seat cushion 3, so that each front link 4 stably supports the seat cushion 3 from below at the initial sitting using position.

Figure 8:
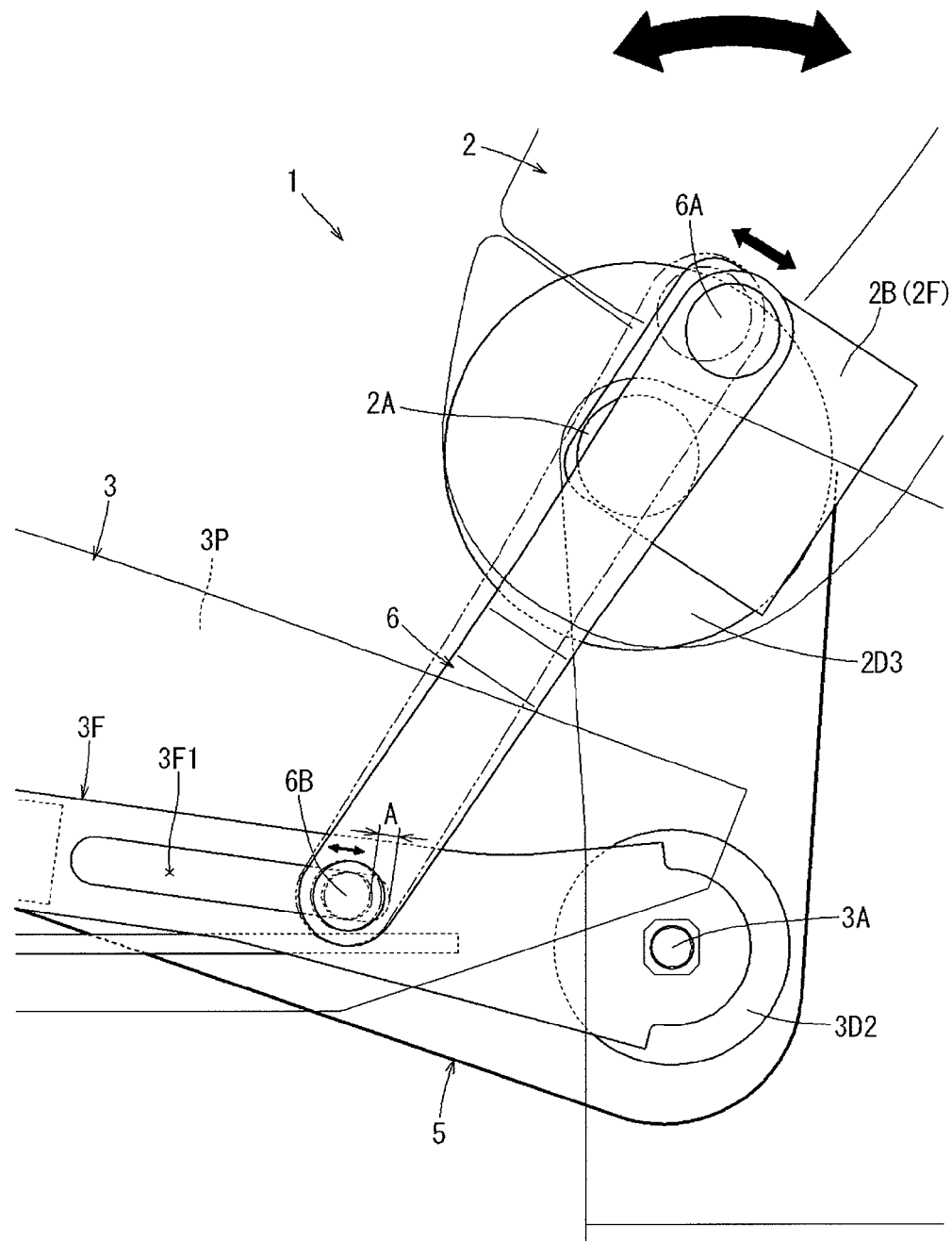
FIG. 8 is an enlarged view of a VIII part of FIG. 2.

By the above movement, the lower end-side slide shaft 6B of each tensile link 6 is slid rearward to the rear side region in the long hole 3F1. However, each long hole 3F1 is formed to have a rearward extension margin A within which each slide shaft 6B can be further slid rearward, as shown in FIG. 8, so that the slide shaft 6B does not reach the rear end portion position of each long hole 3F1. By this configuration, as shown in FIGS. 2 and 3, even when the seat back 2 is angle-changed rearward and forward within the adjustment region of the backrest angle, each slide shaft 6B is slid within the extension margin A of each long hole 3F1, so that the movement can be released. Therefore, when the backrest angle of the seat back 2 is adjusted, each tensile link 6 can keep the seat cushion 3 at the fixed position all the time without further raising or dropping the seat cushion 3.

Specifically, in the adjustment region of the backrest angle of the seat back 2, each tensile link 6 is configured so that the upper end-side coupling shaft 6A passes through the region largely moving rearward and forward around each rotary shaft 2A, which is a center of rotation of the seat back 2, by the tilting movement of the seat back 2. Thereby, each tensile link 6 is moved so that the lower end-side slide shaft 6B is slid rearward and forward in the extension margin A of each long hole 3F1 of the seat cushion 3, in response to the above movement. For this reason, each tensile link 6 is not largely moved in the height direction, and can absorb the movement, which makes each coupling shaft 6A move rearward and forward around the rotary shaft 2A serving as a center of rotation of the seat back 2, by the movement of the slider crank that each slide shaft 6B slides rearward and forward in the long hole 3F1, while keeping the seat cushion 3 at the fixed position.

In summary, the seat 1 of the illustrative embodiment is configured as follows. That is, the seat 1 includes the tilt down mechanism TD configured to sink down the seat cushion 3 in conjunction with the forward tilting down movement of the seat back 2. The tilt down mechanism TD couples the rear part of the seat cushion 3 to the base (rear base RB) on the floor F by the rotary shaft 3A, couples the front part of the seat cushion 3 to the base (front base FA) on the floor F via the front link 4, and further includes the power transmission member (retraction belt 5) that couples the front link 4 and the seat back 2. The tilt down mechanism TD is configured so that the power transmission member (retraction belt 5) tilts the front link 4 downward in conjunction with the forward tilting down movement of the seat back 2, thereby sinking down the front part of the seat cushion 3 about the rotary shaft 3A.

With the above configuration, the seat cushion 3 is configured to sink down to the floor F so that the front part thereof is dropped about the rotary shaft 3A at the rear side by the tilt down mechanism TD. In general, as shown in FIG. 2, the seat cushion 3 is configured in many cases so that a pad thickness of a cushion pad 3P in the height direction is set to be thick in the rear region of the seat cushion 3 so as to support hip parts having a high sitting pressure and is set to be relatively thinner in the front region of the seat cushion 3 to support the femoral regions, as compared to the pad thickness in the rear region of the seat cushion 3, and the seat cushion 3 is formed to have the front rising shape so as to prevent the hip parts from sliding forward. Therefore, when the seat cushion 3 is configured to sink down to the floor F so that the front part thereof is dropped about the rear side rotary shaft 3A, as described above, it is possible to effectively sink down the seat cushion 3 also in the narrow sinking space.

Also, the power transmission member (retraction belt 5) is configured by a flexible member, and is guided while being bent at a predetermined part thereof by the first belt guide 3D1 or second belt guide 3D2 so as to transmit the forward tilting down movement of the seat back 2 to the front link 4 as the tensile force for tilting down the front link 4. In this way, the flexible member is used, so that it is possible to configure the power transmission member (retraction belt 5) simply and with a high degree of freedom in the mounting space.

Also, when the seat back 2 is within the tilting down region in front of the predetermined forward tilting angle (the forward tilting position shown in FIG. 4) at which the seat back 2 is in front of the adjustment region of the backrest angle, the power transmission member (retraction belt 5) is configured to transmit the forward tilting down movement of the seat back 2 to the front link 4 as the tilting down force, and when the seat back 2 is within a region rear to the titling down region, the power transmission member is configured to release the power transmission from the seat back 2 to the front link 4 (the retraction belt 5 is configured to be slack so that the force cannot be transmitted). By this configuration, when adjusting the backrest angle of the seat back 2, it is possible to prevent an unexpected situation where the front link 4 is erroneously tilted downward.

Although the illustrative embodiment of the present invention has been described with reference to one example, the present invention can be implemented in a variety of aspects, in addition to the above illustrative embodiment. For example, the 'vehicle seat' of the present invention can be applied to a seat of an automobile other than the rear seat, and can also be applied to a variety of vehicle seats such as a 'seat for a train', a 'seat for an airplane' and a 'seat for a ship'

Also, the power transmission member may be configured by a flexible member other than the belt, such as a flexible wire, a flexible cable and the like. Also, the power transmission member may be configured by a link of a rigid body and may be configured to tilt the front link downward by the forward tilting down movement of the seat back. Also, the front link may be configured to tilt downward as the lower end-side coupling part thereof slides backward and forward. Also, the front link may be configured to tilt forward, not to tilt backward. Also, the base on the floor configured to couple the front part or rear part of the seat back may be configured by a member fixed on the floor such as a slide rail.

Also, the configuration of the present invention is not limited to a case where it is applied to the narrow sinking space of the seat cushion, and can also be applied to a wide sinking space. That is, the present invention can be applied to a variety of configurations, as one of methods of sinking down the seat cushion.

The present invention provides illustrative, non-limiting aspects as follows:

According to an aspect of the present invention, there is provided a vehicle seat including: a tilt down mechanism configured to sink down a seat cushion in conjunction with forward tilting down movement of a seat back, wherein the tilt down mechanism couples a rear part of the seat cushion to a base on a floor by a rotary shaft, couples a front part of the seat cushion to the base via a front link, and further includes a power transmission member that couples the front link and the seat back, and wherein the tilt down mechanism is configured so that the power transmission member tilts the front link downward in conjunction with the forward tilting down movement of the seat back, thereby sinking down the front part of the seat cushion about the rotary shaft.

Accordingly, the seat cushion is configured to sink down to the floor so that the front part thereof is dropped about the rotary shaft at the rear side by the tilt down mechanism. In general, the seat cushion is configured in many cases so that a pad thickness is set to be thick in the rear region of the seat cushion so as to support hip parts having a high sitting pressure and is set to be relatively thinner in the front region of the seat cushion to support the femoral regions, as compared to the pad thickness in the rear region of the seat cushion, and the seat cushion is formed to have a front rising shape so as to prevent the hip parts from sliding forward. Therefore, when the seat cushion is configured to sink down to the floor so that the front part thereof is dropped about the rear side rotary shaft, as described above, it is possible to effectively sink down the seat cushion also in a narrow sinking space. The corresponding configuration is not limited to a case where it is applied to the narrow sinking space of the seat cushion, and can also be applied to a wide sinking space. That is, the corresponding configuration can be applied to a variety of configurations, as one of methods of sinking down the seat cushion.

In the above vehicle seat, the power transmission member may be configured by a flexible soft member and may be guided while being bent at a predetermined part thereof so as to transmit the forward tilting down movement of the seat back to the front link as a tensile force for tilting down the front link.

Accordingly, the flexible member is used, so that it is possible to configure the power transmission member simply and with a high degree of freedom in the mounting space.

In the above vehicle seat, when the seat back is within a tilting down region in front of a predetermined forward tilting angle at which the seat back is in front of an adjustment region of a backrest angle, the power transmission member may be configured to transmit the forward tilting down movement of the seat back to the front link as a tilting down force, and when the seat back is within a region rear to the tilting down region, the power transmission member may be configured to release power transmission from the seat back to the front link.

Accordingly, when adjusting the backrest angle of the seat back, it is possible to prevent an unexpected situation where the front link is erroneously tilted downward.

What is claimed is:

1. A vehicle seat comprising:
a seat back;
a seat cushion having a front part and a rear part;
a tilt down mechanism including:
a first rotary shaft that that couples the rear part of the seat cushion to a base on a floor;
a front link that couples the front part of the seat cushion to the base; and
a power transmission member that couples the front link and the seat back; and
a second rotary shaft that connects the seat back to the base on the floor, wherein
the power transmission member tilts the front link downward in conjunction with a forward tilting down movement of the seat back around the second rotary shaft, thereby sinking down the front part of the seat cushion about the first rotary shaft.

2. The vehicle seat according to claim 1, wherein the power transmission member is a flexible soft member that is guided and bent at a predetermined part thereof so as to transmit the forward tilting down movement of the seat back to the front link as a tensile force for tilting down the front link.

3. The vehicle seat according to claim 2, wherein
the power transmission member is configured to transmit the forward tilting down movement of the seat back to the front link as a tilting down force based upon the seat back being within a tilting down region in front of a predetermined forward tilting angle at which the seat back is in front of an adjustment region of a backrest angle, and
the power transmission member is configured to release power transmission from the seat back to the front link based upon the seat back being within a region rear to the tilting down region.

4. The vehicle seat according to claim 1, wherein
the power transmission member is configured to transmit the forward tilting down movement of the seat back to the front link as a tilting down force based upon the seat back being within a tilting down region in front of a predetermined forward tilting angle at which the seat back is in front of an adjustment region of a backrest angle, and
the power transmission member is configured to release power transmission from the seat back to the front link based upon the seat back being within a region rear to the tilting down region.

5. The vehicle seat according to claim 1, wherein
the power transmission member tilts the front link rearward in conjunction with the forward tilting down movement of the seat back, thereby sinking down the front part of the seat cushion about the first rotary shaft.

6. The vehicle seat according to claim 1, wherein
the first rotary shaft extends from a right side to a left side of the seat cushion.

7. The vehicle seat according to claim 1, wherein
the second rotary shaft extends through the seat back and the base.

* * * * *